(12) United States Patent
Kanzaka (10) Patent No.: US 8,807,531 B2
(45) Date of Patent: Aug. 19, 2014

(54) VACUUM VALVE BELLOWS

(75) Inventor: Ikuo Kanzaka, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 74 days.

(21) Appl. No.: 13/454,526

(22) Filed: Apr. 24, 2012

(65) Prior Publication Data

US 2012/0286178 A1 Nov. 15, 2012

(30) Foreign Application Priority Data

May 13, 2011 (JP) ................................. 2011-108403

(51) Int. Cl.
 *F16K 31/00* (2006.01)
(52) U.S. Cl.
 USPC ............................... 251/335.3; 29/454; 92/34
(58) Field of Classification Search
 USPC .............. 251/335.1, 335.3; 92/34, 35, 42, 47; 29/454, 888.03
 See application file for complete search history.

(56) References Cited

U.S. PATENT DOCUMENTS

| | | | | |
|---|---|---|---|---|
| 1,756,911 | A * | 4/1930 | Lee | 92/45 |
| 3,302,878 | A * | 2/1967 | Fujiwara | 236/56 |
| 3,787,023 | A * | 1/1974 | Shufflebarger et al. | 251/335.3 |
| 5,011,166 | A * | 4/1991 | Watts | 277/379 |
| 6,305,665 | B1 * | 10/2001 | Coura et al. | 251/335.3 |
| 7,036,790 | B2 | 5/2006 | Kajitani | |
| 7,334,609 | B2 * | 2/2008 | Petersen et al. | 138/121 |
| 7,798,467 | B2 | 9/2010 | Sakurai | |
| 2008/0173842 | A1 * | 7/2008 | Sakurai | 251/335.3 |

FOREIGN PATENT DOCUMENTS

| | | |
|---|---|---|
| JP | 53-24625 B | 7/1978 |
| JP | 62-51120 | 3/1987 |
| JP | 2003-139284 | 5/2003 |
| JP | 2004-340344 | 12/2004 |
| JP | 2006-79989 | 3/2006 |
| JP | 2008-175265 | 7/2008 |
| JP | 2009-302001 | 12/2009 |

OTHER PUBLICATIONS

Office Action dated May 22, 2013 in Japanese Application No. 2011-108403 (With English Translation).
Office Action dated Jul. 3, 2013 in Japanese Application No. 2011-108403 (With English Translation).
Office Action issued Jul. 23, 2013 in Japanese Application No. 2011-108403 (With English Translation).

* cited by examiner

*Primary Examiner* — John K Fristoe, Jr.
*Assistant Examiner* — Marina Tietjen
(74) *Attorney, Agent, or Firm* — Oblon, Spivak, McClelland, Maier & Neustadt, L.L.P.

(57) ABSTRACT

A bellows is disposed to separate a main flow path that is opened or closed by a valve member coming into contact with or moving away from a valve seat from a driving part for driving the valve member via a rod so as to surround the rod. The bellows is formed by providing ring-shaped valley portions swelling inward of a metal pipe and ring-shaped peak portions swelling outward of the metal pipe alternately and continuously in a peripheral wall of the metal pipe in the axial direction of the metal pipe. Valley R/peak R, which is the ratio of valley R to peak R, is in the range of 1.15 to 1.70, where valley R is the radius of curvature of the valley portions in cross section, and peak R is the radius of curvature of the peak portions in cross section.

9 Claims, 5 Drawing Sheets

VACUUM VALVE BELLOWS

BACKGROUND OF THE INVENTION

1. Field of the Invention

The present invention relates to a vacuum valve bellows used in a vacuum valve to separate a driving part for driving a valve member from a main flow path disposed in a vacuum atmosphere.

2. Description of the Related Art

Conventionally, as disclosed in, for example, Japanese Unexamined Patent Application Publication No. 2004-340344, a vacuum valve in which a driving part of a valve member is separated from a main flow path disposed in a vacuum atmosphere by a molded bellows is known as a high-vacuum L valve. This is substantially the same as a vacuum valve illustrated in FIG. 3, except for the detailed configuration of the bellows.

The configuration will be described in more detail. This vacuum valve includes a first main port connected to one of a vacuum pump and a vacuum chamber, a second main port connected to the other of them, a ring-shaped valve seat formed in a main flow path connecting the above-mentioned main ports in a housing, a disc-shaped valve member that comes into contact with or moves away from the valve seat, thereby opening or closing the main flow path, and a driving part for axially driving a rod connected to the valve member, causing the valve member to perform opening and closing motions. To separate the driving part of the valve member from the main flow path in the housing disposed in a vacuum atmosphere, an expandable and contractible molded bellows is provided between the circumference of the disc-shaped valve member and the housing so as to surround the rod.

Typically, the above-described known vacuum valve bellows is fabricated by hydrostatic bulge forming, in which multiple ring-shaped molds are arranged at equal intervals around an untreated pipe composed of a metal pipe and sealed at both ends in a liquid-tight manner, a high-pressure liquid is introduced into the untreated pipe, causing portions of the outer periphery of the untreated pipe that are not in contact with the ring-shaped molds to swell outward, and then the distance between the multiple ring-shaped molds is reduced, and the portions of the untreated pipe swelled outward in a ring-shaped shape serves as peak portions, and ring-shaped portions that are not swelled serves as valley portions.

Typically, this molded bellows is formed such that the radius of curvature of the peak portions in cross section (peak R) is equal to the radius of curvature of the valley portions in cross section (valley R). When the molded bellows is attached to a vacuum valve and used, as the bellows is expanded and contracted, the stress acting on the valley portions tends to cause a fatigue fracture compared with the peak portions. Thus, usually, a crack is generated at the middle portion of the side surface of a valley portion of the bellows (part a in FIG. 1), in the process leading to the end of life.

BRIEF SUMMARY OF THE INVENTION

In order to overcome the above-described problem that a fatigue fracture occurs at a valley portion of the molded bellows, the present inventor conducted experiments and computer simulation to study the maximum stress and changes of the distribution thereof resulting from changing various parameters, more specifically, adjustment of deformability achieved by changing the number of peak portions of the bellows, the thickness of the metal pipe constituting the bellows, and the thickness of a holder at an end of the bellows.

As a result, it is found that easy and effective means for equalizing the stresses acting on the external ring-shaped peak portions and the internal ring-shaped valley portions when the vacuum valve bellows is expanded and contracted as much as possible to extend the life of the bellows is to adjust the radii of curvature of the valley portions and peak portions in cross section (valley R and peak R) relative to each other.

The present invention has been made on the basis of the above findings, and a technical object thereof is to equalize the stresses acting on the internal ring-shaped valley portions and the external ring-shaped peak portions when the vacuum valve bellows is expanded and contracted as much as possible to extend the life of the bellows, by setting the radii of curvature of the valley portions and peak portions in cross section to an appropriate range.

Furthermore, the vacuum valve bellows is basically used such that the axial length of the bellows when the valve member is at a position in contact with the valve seat serves as the free length of the bellows or such that the axial length of the bellows when the valve member is at a position in contact with the valve seat serves as the length extended from the free length thereof to a position where the valve member comes into contact with the valve seat. Therefore, in either case, it is desirable that the stresses acting on the valley portions and the peak portions when the bellows is expanded and contracted be made as equal as possible. As a result of a study of the results of the above-described computer simulation performed by the present inventor, it is found that, as will be described in detail below, when determining an appropriate range of the ratio of the radii of curvature of the valley portions and peak portions in cross section (valley R/peak R), an effective way to equalize the level of metal fatigue due to repeated stress is to refer to the stress amplitudes at the valley portions and the peak portions while the valve member performs an opening/closing motion, regardless of how much the bellows is extended (compression ratio, described below) when the valve member is at a position in contact with the valve seat.

Another technical object of the present invention is to obtain an appropriate ratio of valley R to peak R, on the basis of the above findings.

In order to achieve the above-described objects, the present invention provides a vacuum valve bellows attached to a vacuum valve, which includes a main flow path that is opened or closed by a disc-shaped valve member coming into contact with or moving away from a valve seat and a driving part for driving the valve member via a rod, so as to surround the rod to separate the main flow path from the driving part. The bellows is formed by providing ring-shaped valley portions swelling inward of a metal pipe and ring-shaped peak portions swelling outward of the metal pipe alternately and continuously in a peripheral wall of the metal pipe in the axial direction of the metal pipe. Valley R/peak R, which is the ratio of valley R to peak R, is in the range of 1.15 to 1.70, where valley R is the radius of curvature of the valley portions in cross section, and peak R is the radius of curvature of the peak portions in cross section, in a state in which no external force from the rod acts on the bellows.

In the above-described vacuum valve bellows, it is more desirable that the R ratio be set in the range of 1.20 to 1.55.

In a preferred embodiment of the vacuum valve bellows of the present invention, the axial length of the bellows when the valve member is at a position in contact with the valve seat is the free length of the bellows, and the bellows is compressed from the free length of the bellows by a total amount of displacement when the valve member is at a fully open position.

Furthermore, in another preferred embodiment of the vacuum valve bellows of the present invention, when the valve member is at a position in contact with the valve seat, the bellows is in a state in which it is extended from the free length of the bellows to a position where the valve member is in contact with the valve seat, and, when the valve member is at a fully open position, the bellows is compressed from the free length of the bellows by a total amount of displacement.

In this case, the length by which the bellows is extended when the valve member is at a position in contact with the valve seat may be equal to or smaller than the length by which the bellows is compressed when the valve member is at the fully open position.

Furthermore, in a preferred embodiment of the present invention, the metal pipe constituting the bellows is formed by deep-drawing a thin metal sheet composed of stainless steel.

According to the present invention described in detail above, by using simple means in which the metal pipe is formed by hydrostatic bulge forming while adjusting the radii of curvature of the valley portions and peak portions of the vacuum valve bellows in cross section relative to each other and setting the ratio of the radii of curvature to the appropriate range described above, the stresses acting on the valley portions and the peak portions when the vacuum valve bellows is expanded and contracted can be made as equal as possible, thereby increasing the life of the bellows.

Furthermore, according to the present invention, when determining an appropriate range of the ratio of the radii of curvature of the valley portions and peak portions (valley R/peak R), by referring to the stress amplitudes at the valley portions and the peak portions while the valve member performs an opening/closing motion, a bellows in which the level of metal fatigue due to repeated stress is equalized can be achieved, regardless of how much the bellows is extended (compression ratio) when the valve member is at a position in contact with the valve seat.

DETAILED DESCRIPTION OF THE INVENTION

Figure 1:
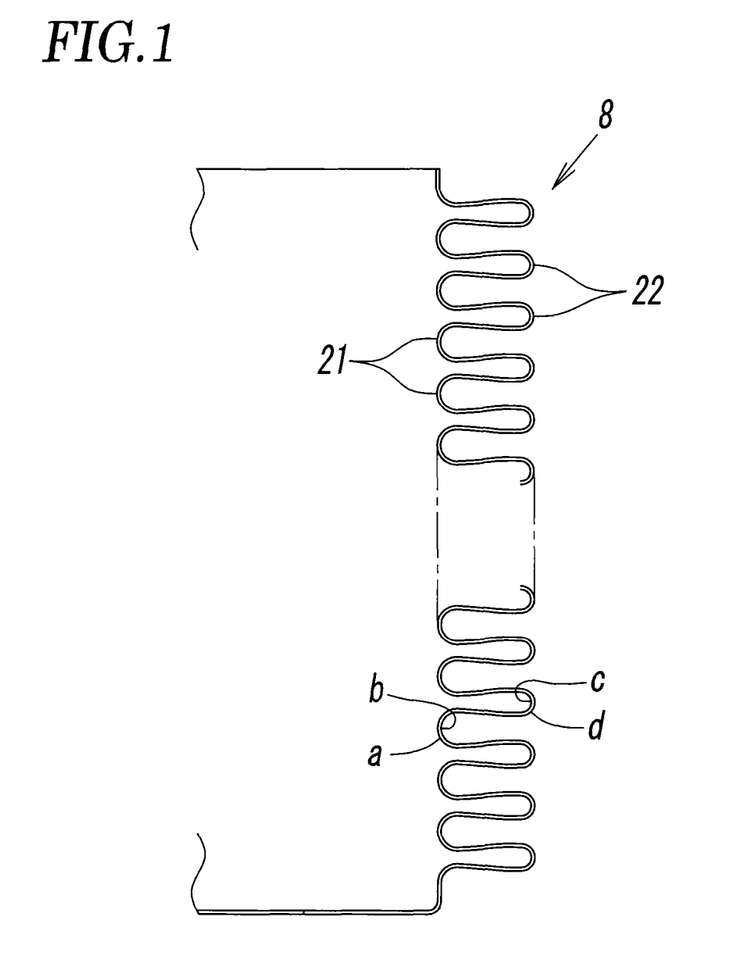
FIG. 1 is a vertical cross-sectional view of the relevant part showing an embodiment of a vacuum valve bellows of the present invention.
Figure 2:
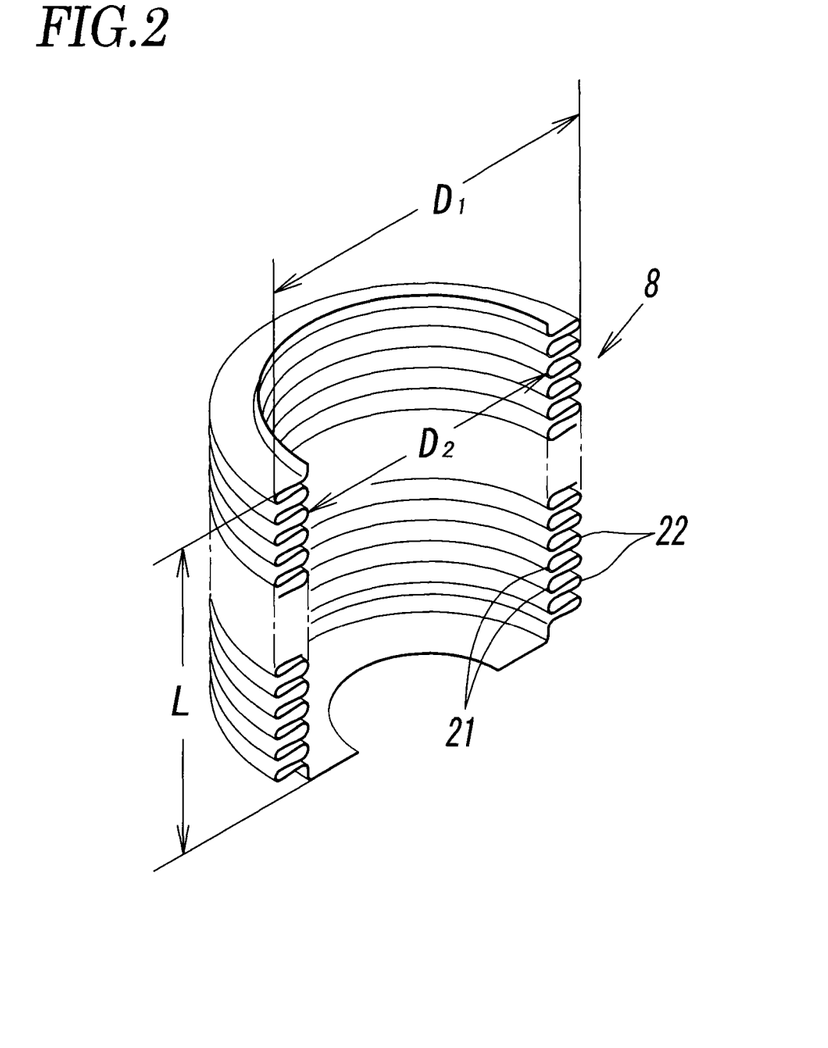
FIG. 2 is a cutaway perspective view of the relevant part in the embodiment.
Figure 3:
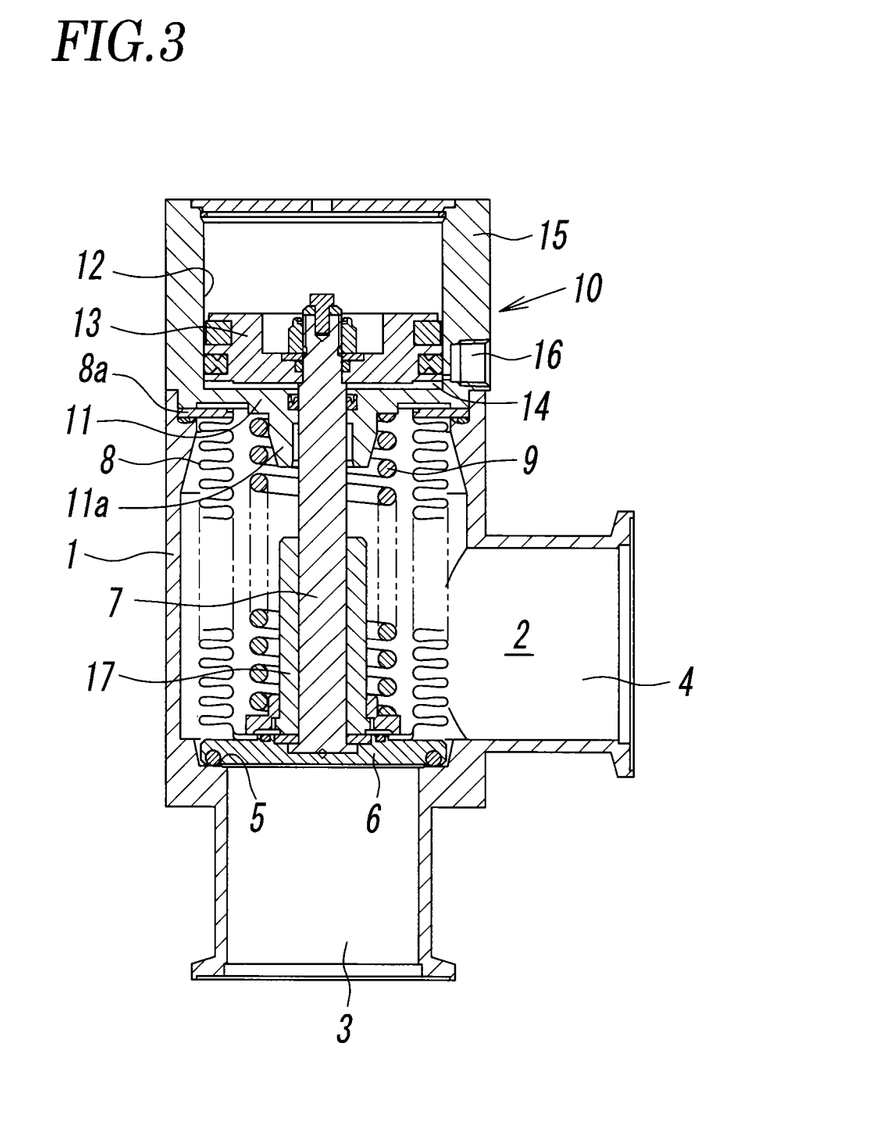
FIG. 3 is a cross-sectional view of a high-vacuum L valve including the vacuum valve bellows according to the embodiment.

FIGS. 1 and 2 show an embodiment of a vacuum valve bellows of the present invention, and FIG. 3 shows an example configuration of a vacuum valve having the bellows.

First, referring to FIG. 3, the configuration of the vacuum valve used by attaching the above-described vacuum valve bellows will be described. This vacuum valve includes a first main port 3 connected to one of a vacuum pump and a vacuum chamber, a second main port 4 connected to the other of them, a ring-shaped valve seat 5 formed in a main flow path 2 connecting the main ports 3 and 4 in a housing 1, a disc-shaped valve member 6 that comes into contact with or moves away from the valve seat 5, thereby opening or closing the main flow path 2, a rod 7 connected to the valve member 6, and a driving part 10 for axially driving the rod 7, causing the valve member 6 to perform opening and closing motions.

The configuration of a driving system, in which the driving part 10 drives the valve member 6 via the rod 7, will be described. In this driving system, a tip of the rod 7 for driving is attached to the center of the back surface of the valve member 6, and the rod 7 is axially driven by the driving part 10. Since there is a need to separate the driving part 10 separated from the main flow path 2 by the housing 1, from the main flow path 2 around the valve member 6 opened or closed by the valve member 6 coming into contact with or moving away from the valve seat 5, an expandable and contractible bellows 8 is disposed so as to surround the rod 7. Thus, when the vacuum pump is operating, the outside of the bellows 8 constituting the main flow path 2 is disposed in a vacuum atmosphere, and the inside of the bellows is disposed under an atmospheric pressure. Furthermore, a coil-shaped return spring 9 that urges the valve member 6 in a direction in which the valve is closed is provided between the back surface of the valve member 6 and a partition wall 11 of the driving part 10.

The rod 7 extends in the housing 1 along the center axis thereof, and the base end thereof passes through the partition wall 11 defining the driving part 10 and is connected a piston 13 in a cylinder chamber 12. Furthermore, a tubular stopper 17, which comes into contact with a central tubular portion 11a of the partition wall 11 at the tip, thereby limiting the fully open position of the valve member 6 and setting the stroke of the valve member 6, is fixed around the rod 7 attached to the back surface of the valve member 6. Moreover, the piston 13 defines a pressure chamber 14 with respect to the partition wall 11. Since the pressure chamber 14 communicates with an operation port 16 provided in the side surface of the cylinder body 15, the valve member 6 is driven in a direction away from the valve seat 5 by supplying pressure fluid to the operation port 16 from the outside.

The expandable and contractible bellows 8 is provided on the back surface side of the valve member 6 so as to surround the rod 7 and the return spring 9. One end of the bellows 8 is attached to the back surface of the valve member 6 in an air-tight manner, and the other end of the bellows 8 is attached to a support plate 8a provided between an end of the housing 1 and the partition wall 11. The bellows 8 is made of a metal pipe obtained by deep-drawing a thin metal sheet composed of stainless steel. The bellows 8 is a molded bellows in which ring-shaped valley portions 21 swelling outward and ring-shaped peak portions 22 facing inward are formed alternately and continuously in the peripheral wall of the metal pipe in the axial direction of the metal pipe.

As described above, in a vacuum valve using a conventional molded bellows, as the bellows is expanded and contracted, more stress tends to act on the valley portions than the peak portions. Thus, a fatigue fracture often occurs at a valley portion in the process leading to the end of life. However, in the molded bellows 8 of the present invention, on the basis of the findings that an effective way to solve the above-described fatigue fracture problem is to set the R ratio, which is the ratio of valley R to peak R, to an appropriate range, and on the basis of the results of the experiments and the computer simulation described below, the R ratio is set to an appropriate range, that is, a range such that the stresses acting on the internal valley portions 21 and external peak portions 22 when the bellows is extended and contracted can be made as equal as possible.

In conclusion, in order to make the stresses acting on the valley portions 21 and peak portions 22 as equal as possible, it is effective that the R ratio be in the range of 1.15 to 1.70 in a state in which no external force from the rod 7 acts on the bellows 8 itself (free length), and it is more desirable that the R ratio be in the range of 1.20 to 1.55.

When the bellows 8 is mounted to the periphery of the rod 7 of the vacuum valve, it is set such that the axial length of the bellows 8 when the valve member 6 is at a position in contact with the valve seat 5 serves as the free length of the bellows 8 itself. Therefore, the axial length of the bellows 8 when the valve member 6 is at the fully open position equals to a length which is deducted the total amount of displacement from the free length of the bellows 8, and the bellows 8 is compressed by the total amount of displacement from the free length thereof. Data of the R ratio and the like which will be described below are the data for the case where the above-described mounting is performed.

Note that the free length of the bellows may be set assuming that the axial length of the bellows 8 when the valve member 6 is at a position in contact with the valve seat 5 serves as the length extended from the free length of the bellows 8 to the position in which the valve member 6 is in contact with the valve seat 5 and assuming that the axial length of the bellows when the valve member is at the fully open position serves as the free length of the bellows compressed by the total amount of displacement. These will be described in more detail below.

Next, the results of the experiments and the computer simulation confirming that the R ratio and the like set to the above-described value range is effective will be described in detail below, on the basis of the data thereof.

First, using bellows test pieces having an outside diameter $D_1$ of 120.0 mm, an inside diameter $D_2$ of 94.5 mm, a peak height of 12.8 mm, a free length L of 160 mm, a thickness of 0.22 mm, and 19 peak portions, which are listed as models 1 to 14 in Table 1, the bellows test pieces having an R ratio in the range of 0.54 to 2.08 based on valley R, peak R, and the radii of curvature thereof, the stress and the like on these test pieces, which will be described below, were determined under a condition in which the ambient pressure inside the bellows test pieces is an atmospheric pressure and the outside pressure thereof is vacuum.

For each test piece, the stress value (simulation value) acting on each of the central part, a, and the outer peripheral part, b, of a valley portion 21, the central part, c, and the outer peripheral part, d, of a peak portion 22 are determined in the state in which a compression displacement of 40 mm is given in the central axis direction and in the state in which the bellows test piece is left in a free-length state so that only a difference between internal and external pressures acts. Furthermore, for each test piece having the corresponding R ratio, the fluctuating range of stress at each of parts a to d, in the case where the above compression displacement is given and in the case where it is left in a free-length state, in other words, the stress amplitude at each part is determined while the valve member 6 performs an opening/closing motion of the valve seat 5, and the results are shown in Table 1. Note that values prefixed with minus sign in the tables represent compression stresses.

The stress amplitude shows the fluctuating range of stress at each of parts a to d during an opening/closing motion of the valve member 6. An increase of the fluctuating range at any part is undesirable because repeated application of significantly different stresses causes metal fatigue. However, even if the fluctuating range is small, the stress value itself is not allowed to exceed a certain limit. Accordingly, it is desirable to employ such an R ratio that the fluctuating range of stress is relatively small and that the maximum stress itself does not exceed a certain upper limit value.

Figure 4:
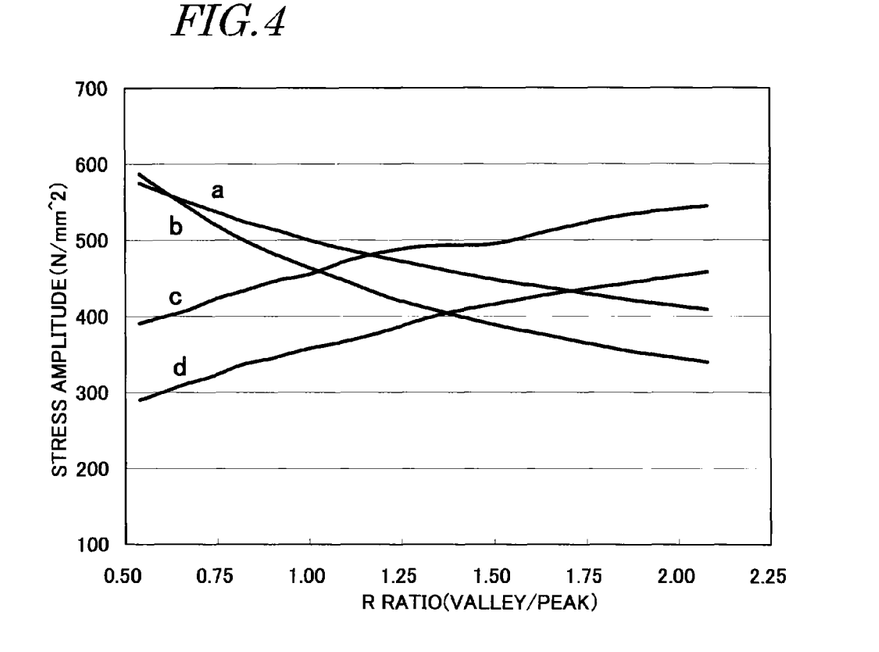
FIG. 4 is a graph of data of stress amplitude of the bellows, shown in Table 1, versus R ratio.

FIG. 4 is a graph of the stress amplitude at each of parts a to d in Table 1 versus R ratio. In FIG. 4, with an R ratio in the range of 1.15 to 1.70, the stress amplitude at any part a to d shows a relatively small value, and furthermore, at the lower limit value of the above range of R ratio, the stress amplitude at part a where damage due to metal fatigue occurs in the conventional bellows is substantially the same as the stress amplitude at part c where damage is relatively less likely to occur. Moreover, the stress amplitude at part d where the possibility of occurrence of metal fatigue is the second highest to part a is sufficiently small. Accordingly, it can be said that the lower limit value of the above-described ranges is desirable, from the standpoint of avoiding metal fatigue due to repeated stress.

On the other hand, at the upper limit value of the above range of R ratio, the stress amplitude at part a is substantially the same as that at part d, and the values of the stress amplitudes themselves are small. If the upper limit value is exceeded, the stress amplitude at part d increases. Thus, it can be said that the upper limit value is also desirable, from the standpoint of avoiding metal fatigue due to repeated stress.

Furthermore, the maximum stresses at the respective parts a to d with an R ratio in the range of 1.15 to 1.70 will be considered. The example of model 7 in Table 1 corresponds to a known bellows having a valley R and a peak R of both 2.0 mm, and the maximum stress at part a of model 7 that is most likely to be damaged is 599. In contrast, in the examples of models 9 to 12 in Table 1, which have an R ratio in the range of 1.15 to 1.70, the maximum stress at part a is sufficiently smaller than that of the example of model 7. In particular, the maximum stress determined by assuming that the maximum stress when the R ratio is 1.15, which is the lower limit value, proportionally changes between model 8 and model 9 is 578, which is sufficiently smaller than that of the example of model 7. In addition, the maximum stresses at the other parts b to d are even smaller. As a result, it can be said that an R ratio in the range of 1.15 to 1.70 is effective to make the stresses acting on the valley portions 21 and peak portions 22 as equal as possible.

Referring to FIG. 4, a more desirable range of R ratio will be considered.

It can be said that it is desirable to employ an R ratio of 1.20 for the lower limit of the range of R ratio, with which the stress amplitude at part a where the possibility of damage is high is smaller than the stress amplitude at part c, and hence, part a does not have the largest stress amplitude compared with the other parts; to employ an R ratio of 1.55 for the upper limit of the R ratio, with which part b where the stress amplitude decreases to the minimum as the R ratio increases is ignored, the stress amplitudes at the other parts, a, c, and d, take similar values, and hence, the level of metal fatigue due to repeated stress is equalized; and, thus, to set the range of R ratio as 1.20 to 1.55.

TABLE 1

| | Length | | | Compression: Analysis results (N/mm^2) | | | | Free length: Analysis results (N/mm^2) | | | | Stress amplitude (N/mm^2) | | | |
|---|---|---|---|---|---|---|---|---|---|---|---|---|---|---|---|
| Model | Valley R (mm) | Peak R (mm) | R Ratio (Valley/Peak) | a | b | c | d | a | b | c | d | a | b | c | d |
| 1 | 1.4 | 2.6 | 0.54 | 683 | −710 | −311 | 233 | 108 | −123 | 80 | −57 | 575 | 587 | 391 | 290 |
| 2 | 1.5 | 2.5 | 0.60 | 670 | −687 | −317 | 240 | 107 | −121 | 82 | −60 | 563 | 566 | 399 | 300 |
| 3 | 1.6 | 2.4 | 0.67 | 657 | −662 | −323 | 248 | 106 | −117 | 85 | −64 | 551 | 545 | 408 | 312 |
| 4 | 1.7 | 2.3 | 0.74 | 644 | −636 | −332 | 255 | 105 | −114 | 90 | −67 | 539 | 522 | 422 | 322 |
| 5 | 1.8 | 2.2 | 0.82 | 628 | −611 | −340 | 266 | 103 | −110 | 93 | −71 | 525 | 501 | 433 | 337 |
| 6 | 1.9 | 2.1 | 0.90 | 615 | −588 | −350 | 272 | 101 | −106 | 96 | −74 | 514 | 482 | 446 | 346 |
| 7 | 2.0 | 2.0 | 1.00 | 599 | −565 | −356 | 280 | 99 | −101 | 99 | −78 | 500 | 464 | 455 | 358 |
| 8 | 2.1 | 1.9 | 1.11 | 584 | −540 | −370 | 288 | 97 | −95 | 103 | −80 | 487 | 445 | 473 | 368 |
| 9 | 2.2 | 1.8 | 1.22 | 568 | −516 | −380 | 299 | 93 | −92 | 106 | −84 | 475 | 424 | 486 | 383 |
| 10 | 2.3 | 1.7 | 1.35 | 552 | −495 | −385 | 314 | 90 | −88 | 108 | −88 | 462 | 407 | 493 | 402 |
| 11 | 2.4 | 1.6 | 1.50 | 535 | −472 | −385 | 325 | 87 | −83 | 110 | −91 | 448 | 389 | 495 | 416 |
| 12 | 2.5 | 1.5 | 1.67 | 519 | −451 | −402 | 336 | 83 | −78 | 112 | −94 | 436 | 373 | 514 | 430 |
| 13 | 2.6 | 1.4 | 1.86 | 502 | −429 | −419 | 348 | 80 | −74 | 114 | −95 | 422 | 355 | 533 | 443 |
| 14 | 2.7 | 1.3 | 2.08 | 485 | −410 | −429 | 359 | 76 | −70 | 116 | −99 | 409 | 340 | 545 | 458 |

The above-described vacuum valve bellows 8, when it is mounted to the periphery of the rod 7 of the vacuum valve, is set such that the axial length of the bellows 8 when the valve member 6 is at a position in contact with the valve seat 5 serves as the free length of the bellows 8 itself. Setting the free length of the bellows 8 like this is advantageous in that the bellows 8 in an uncompressed state can be mounted to the vacuum valve, but is disadvantageous in that the amount of the compressive deformation of the bellows 8 when the valve member 6 is at the fully open position is larger than that is the case where the axial length of the bellows 8 when the valve member 6 is at a position in contact with the valve seat 5, increasing the maximum stress acting on the bellows 8 by the corresponding amount. However, it can be said that this is effective means for preventing damage to the bellows 8, because, as described above, the fluctuating range of stress acting can be reduced in comparison with the conventional example, and furthermore, the maximum stress itself can also be reduced just by setting the R ratio in the range of 1.15 to 1.70.

Furthermore, as described above, it is also possible to set the free length of the bellows 8 not such that the axial length of the bellows 8 when the valve member 6 is at a position in contact with the valve seat 5 serves as the free length of the bellows 8 itself, but such that the axial length of the bellows 8 when the valve member 6 is at a position in contact with the valve seat 5 serves as the free length of the bellows extended until the valve member 6 comes into contact with the valve seat 5, and such that the axial length of the bellows 8 when the valve member 6 is at the fully open position serves as the free length of the bellows 8 compressed by the total amount of displacement.

In this case, for example, the case where the axial length of the bellows 8 when the valve member 6 is at the fully open position is equal to the length compressed by 75% with respect to the maximum displacement length of the bellows 8 (the maximum stroke of the valve member 6) and the case where the axial length of the bellows 8 when the valve member 6 is at a position in contact with the valve seat 5 is equal to the length extended by 25% with respect to the maximum displacement length of the bellows 8 are herein expressed as a compression ratio of 75%, using the value "75%" on the compression side of the bellows 8.

According to this expression, in the above-described example described with reference to Table 1 and FIG. 4, the compression ratio of the bellows 8 is 100%.

Next, referring to Tables 2 and 3, and FIGS. 5 and 6 corresponding thereto, effective R ratios and the like will be described when the compression ratios are 75% and 50%, i.e., in case that the axial length of the bellows 8 when the valve member 6 is at the fully open position is set to the length compressed to 75% and 50% with respect to the displacement length of the bellows (the maximum stroke of the valve member 6).

Note that, although bellows test pieces in Tables 2 and 3 are exactly the same as those described in relation to the data of Table 1 above, the models listed are samples corresponding to some of models 1 to 14 in Table 1. Tables 2 and 3 show, similarly to the case of Table 1, the stress and stress amplitude at each of parts a to d for each model. Tables 2 and 3 show the data for the cases where the compression ratios are 75% and 50%. That is, in Tables 1 to 3, because the displacement of the valve member 6 is 40 mm, and the displacement of the bellows 8 when the valve member 6 is fully open is set to 40 mm, 30 mm, and 20 mm, respectively, the compression ratios in the cases of Tables 1 to 3 are 100, 75, and 50, respectively.

Figure 5:
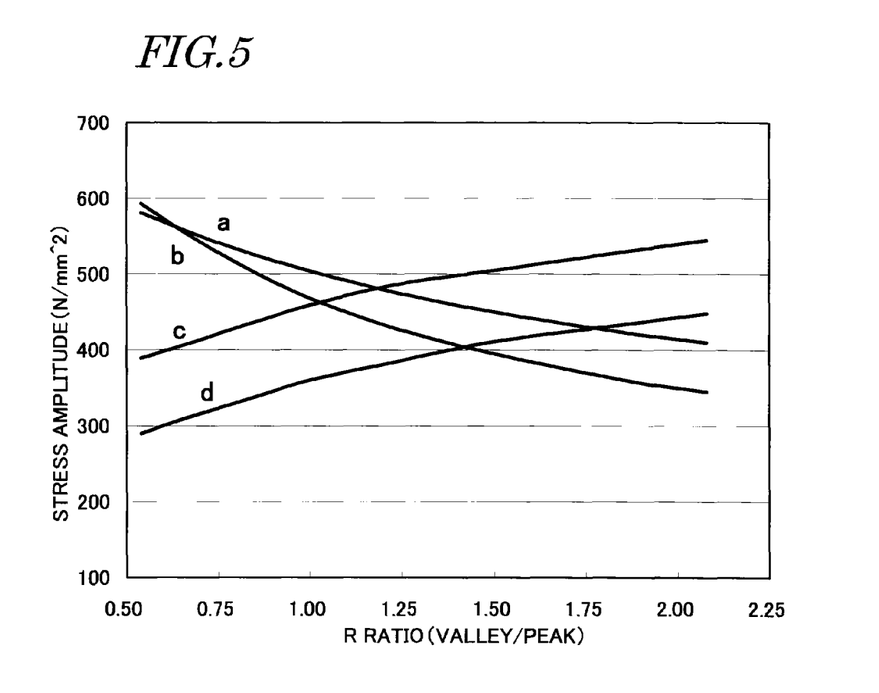
FIG. 5 is a graph of data of stress amplitude of the bellows with a compression ratio of 75%, shown in Table 2, versus R ratio.
Figure 6:
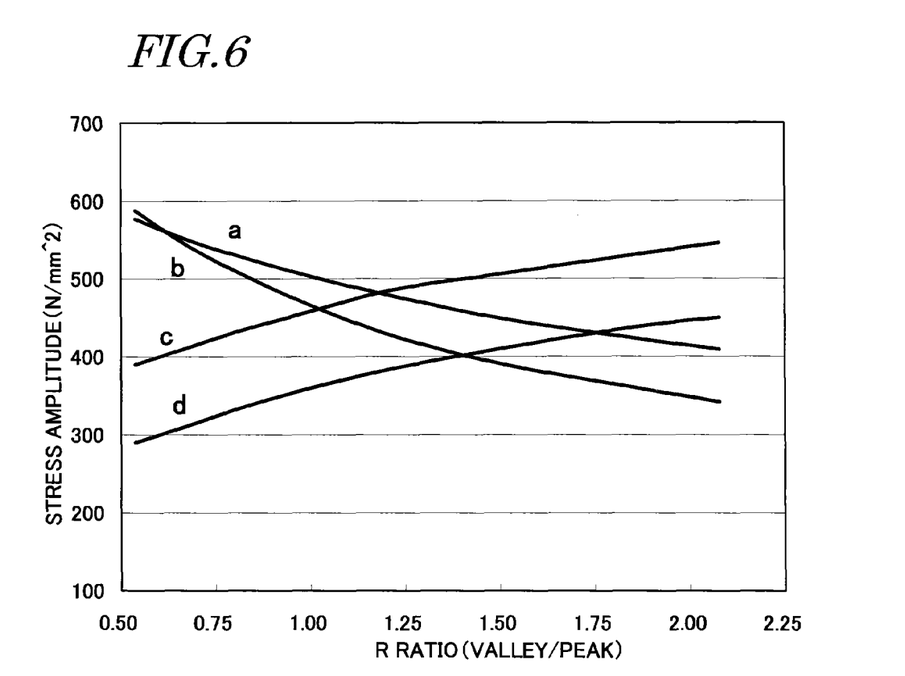
FIG. 6 is a graph of data of stress amplitude of the bellows with a compression ratio of 50%, shown in Table 3, versus R ratio.

FIGS. 5 and 6 are graphs of the stress amplitude at each of parts a to d in Tables 2 and 3 versus R ratio, similarly to the case where the compression ratio is 100%, described with reference to Table 1 and FIG. 4. When these are compared with FIG. 4, the change of stress amplitude at each of parts a to d clearly shows the same tendency in any case. Accordingly, it can be said that an R ratio of the bellows 8 in the range of 1.15 to 1.70 is effective to make the stresses acting on the valley portions 21 and peak portions 22 as equal as possible regardless of the compression ratio. It is true for a more desirable case, in which the R ratio is in the range of 1.20 to 1.55.

Figure 7:
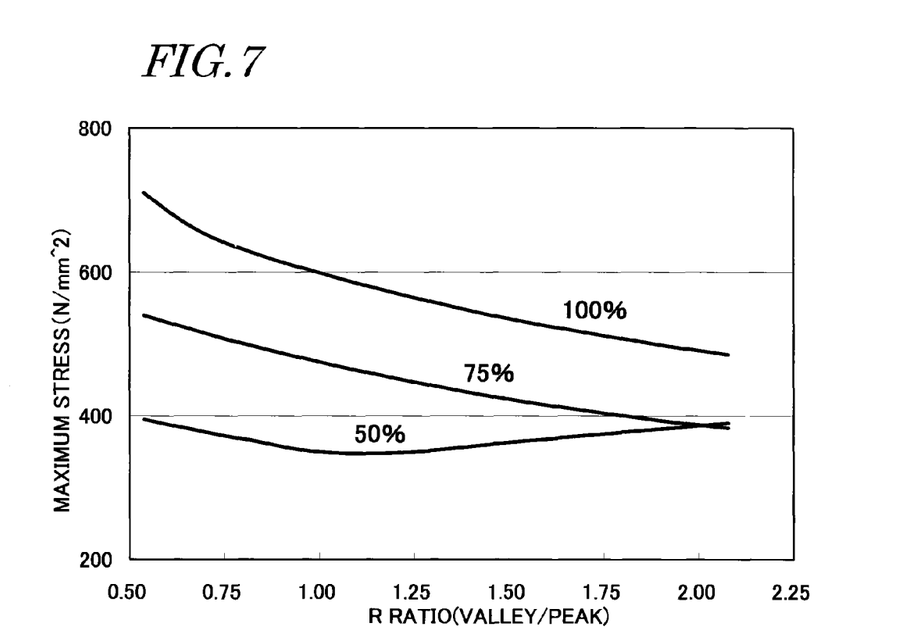
FIG. 7 is a graph of the maximum stresses of bellows having different compression ratios versus R ratio.

Furthermore, as shown in Tables 2 and 3, when the compression ratios are 75 and 50, it is obvious that the maximum stresses become smaller than those of the compression ratio 100 in Table 1 from Tables 1 to 3 as well as the content of FIG. 7 which shows the maximum stresses correspond to change of the R ratio, when the compression ratios are 100, 75 and 50.

It should be noted in FIG. 7 that the maximum stress shows a low value when the compression ratio is 50% and the R ratio is around 1.0 to 5.0; it can be said that this range is very effective to prevent damage to the bellows.

Furthermore, it is obvious from the above-described data of the compression ratios that it is possible to obtain a bellows effective for preventing damage, by making the extended length of the bellows 8 when the valve member 6 is at a position in contact with the valve seat 5 equal to (a compression ratio of 50%) or less than (a compression ratio of 50% or more) the compressed length of the bellows 8 when the valve member 6 is at the fully open position.

TABLE 2

| | Length | | | Compression: Analysis results | | | | Tension: Analysis results | | | | Stress amplitude Compression + Tension | | | |
|---|---|---|---|---|---|---|---|---|---|---|---|---|---|---|---|
| | Valley R | Peak R | R Ratio | (N/mm^2) | | | | (N/mm^2) | | | | (N/mm^2) | | | |
| Model | (mm) | (mm) | (Valley/Peak) | a | b | c | d | a | b | c | d | a | b | c | d |
| 1 | 1.4 | 2.6 | 0.54 | 540 | −562 | −213 | 160 | −41 | 31 | 176 | −130 | 581 | 593 | 389 | 290 |
| 3 | 1.6 | 2.4 | 0.67 | 520 | −525 | −222 | 170 | −36 | 27 | 186 | −141 | 556 | 552 | 408 | 311 |
| 5 | 1.8 | 2.2 | 0.82 | 498 | −487 | −232 | 180 | −32 | 23 | 200 | −153 | 530 | 510 | 432 | 333 |
| 7 | 2.0 | 2.0 | 1.00 | 475 | −448 | −244 | 194 | −29 | 20 | 215 | −166 | 504 | 468 | 459 | 360 |
| 9 | 2.2 | 1.8 | 1.22 | 450 | −410 | −258 | 204 | −27 | 20 | 227 | −179 | 477 | 430 | 485 | 383 |
| 11 | 2.4 | 1.6 | 1.50 | 423 | −375 | −269 | 220 | −27 | 20 | 236 | −191 | 450 | 395 | 505 | 411 |
| 13 | 2.6 | 1.4 | 1.86 | 396 | −340 | −282 | 232 | −27 | 20 | 248 | −202 | 423 | 360 | 530 | 434 |
| 14 | 2.7 | 1.3 | 2.08 | 383 | −325 | −292 | 240 | −27 | 20 | 253 | −208 | 410 | 345 | 545 | 448 |

TABLE 3

| | Length | | | Compression: Analysis Results | | | | Tension: Analysis results | | | | Stress amplitude Compression + Tension | | | |
|---|---|---|---|---|---|---|---|---|---|---|---|---|---|---|---|
| | Valley R | Peak R | R Ratio | (N/mm^2) | | | | (N/mm^2) | | | | (N/mm^2) | | | |
| Model | (mm) | (mm) | (Valley/Peak) | a | b | c | d | a | b | c | d | a | b | c | d |
| 1 | 1.4 | 2.6 | 0.54 | 395 | −415 | −116 | 88 | −182 | 173 | 274 | −202 | 577 | 588 | 390 | 290 |
| 3 | 1.6 | 2.4 | 0.67 | 381 | −388 | −120 | 92 | −171 | 158 | 290 | −218 | 552 | 546 | 410 | 310 |
| 5 | 1.8 | 2.2 | 0.82 | 366 | −361 | −124 | 98 | −162 | 145 | 310 | −237 | 528 | 506 | 434 | 335 |
| 7 | 2.0 | 2.0 | 1.00 | 350 | −333 | −132 | 105 | −153 | 133 | 326 | −255 | 503 | 466 | 458 | 360 |
| 9 | 2.2 | 1.8 | 1.22 | 332 | −304 | −137 | 110 | −145 | 122 | 349 | −275 | 477 | 426 | 486 | 385 |
| 11 | 2.4 | 1.6 | 1.50 | 311 | −278 | −143 | 118 | −138 | 113 | 363 | −292 | 449 | 391 | 506 | 410 |
| 13 | 2.6 | 1.4 | 1.86 | 291 | −254 | −151 | 126 | −132 | 106 | 380 | −312 | 423 | 360 | 531 | 438 |
| 14 | 2.7 | 1.3 | 2.08 | 280 | −240 | −156 | 130 | −129 | 102 | 390 | −320 | 409 | 342 | 546 | 450 |

The invention claimed is:

1. An apparatus comprising:
a vacuum valve in which an inside pressure is an atmospheric pressure and an outside pressure is a vacuum, the vacuum valve including a main flow path that is opened or closed by a disc-shaped valve member coming into contact with or moving away from a valve seat and a driving part for driving the valve member via a rod, so as to surround the rod to separate the main flow path from the driving part; and
a vacuum valve bellows attached to the vacuum valve,
wherein the bellows includes ring-shaped valley portions swelling inward of a metal pipe and ring-shaped peak portions swelling outward of the metal pipe alternately and continuously in a peripheral wall of the metal pipe in an axial direction of the metal pipe, and
wherein valley R is larger than peak R and valley R/peak R, which is a ratio of valley R to peak R, is in the range of 1.15 to 1.52, where valley R is a radius of curvature of the valley portions in cross section, and peak R is a radius of curvature of the peak portions in cross section, in a state in which no external force from the rod acts on the bellows.

2. The apparatus according to claim 1, wherein valley R/peak R which is the ratio of valley R to peak R, is in the range of 1.20 to 1.52.

3. The apparatus according to claim 1, wherein an axial length of the bellows when the valve member is at a position in contact with the valve seat is a free length of the bellows, and the bellows is compressed from the free length of the bellows by a total amount of displacement, when the valve member is at a fully open position.

4. The apparatus according to claim 3, wherein the metal pipe constituting the bellows is formed by deep-drawing a thin metal sheet composed of stainless steel.

5. The apparatus according to claim 1, wherein, when the valve member is at a position in contact with the valve seat, the bellows is in a state in which it is extended from a free length of the bellows to a position where the valve member is in contact with the valve seat, and when the valve member is at a fully open position, the bellows is compressed from the free length of the bellows by a total amount of displacement.

6. The apparatus according to claim 5, wherein, when the valve member is at a position in contact with the valve seat, a length by which the bellows is extended is equal to or smaller than a length by which the bellows is compressed when the valve member is at the filly open position.

7. The apparatus according to claim 6, wherein the metal pipe constituting the bellows is formed by deep-drawing a thin metal sheet composed of stainless steel.

8. The apparatus according to claim 5, wherein the metal pipe constituting the bellows is formed by deep-drawing a thin metal sheet composed of stainless steel.

9. The apparatus according to claim 1, wherein the metal pipe constituting the bellows is formed by deep-drawing a thin metal sheet composed of stainless steel.

* * * * *